United States Patent [19]
Huber

[11] Patent Number: 5,678,319
[45] Date of Patent: Oct. 21, 1997

[54] INDEX GRATING HAVING PARTIAL FIELDS THAT ARE GEOMETRICALLY OFFSET IN THE MEASURING DIRECTION

[75] Inventor: Walter Huber, Traunstein, Austria

[73] Assignee: Dr. Johannes Heidenhain GmbH, Traunreut, Germany

[21] Appl. No.: 610,745

[22] Filed: Mar. 4, 1996

[30] Foreign Application Priority Data

Mar. 4, 1995 [DE] Germany ............... 195 07 613.3

[51] Int. Cl.$^6$ ............................................. G01B 11/02
[52] U.S. Cl. ................................. 33/707; 356/374
[58] Field of Search ........................ 33/707, 706, 702, 33/703, 704, 708; 356/373, 374

[56] References Cited

U.S. PATENT DOCUMENTS

| | | |
|---|---|---|
| 4,385,836 | 5/1983 | Schmitt. |
| 4,461,083 | 7/1984 | Ernst ............... 33/707 |
| 4,519,709 | 5/1985 | Nelle ............... 33/707 |
| 5,260,769 | 11/1993 | Ieki et al. ............... 33/707 |
| 5,404,226 | 4/1995 | Kellner ............... 33/707 |
| 5,456,021 | 10/1995 | Nelle et al. ............... 33/706 |
| 5,553,390 | 9/1996 | Ernst et al. ............... 33/706 |
| 5,576,537 | 11/1996 | Holzapfel ............... 33/707 |
| 5,583,798 | 12/1996 | Franz et al. ............... 33/707 |

FOREIGN PATENT DOCUMENTS

| | | |
|---|---|---|
| 0163362 | 12/1985 | European Pat. Off.. |
| 0223009 | 5/1987 | European Pat. Off.. |
| 3007311 | 10/1981 | Germany. |
| 3125184 | 1/1983 | Germany. |
| 4303162 | 8/1994 | Germany. |
| 4316250 | 11/1994 | Germany. |

OTHER PUBLICATIONS

Willhelm, J., dissertation entitled "Dreigitterschrittgeber Photoelektrische Aufnehmer Zur Messung Von Lageänderungen," published Jun. 23, 1941.

*Primary Examiner*—Christopher W. Fulton
*Attorney, Agent, or Firm*—Brinks Hofer Gilson & Lione

[57] ABSTRACT

A linear or angular measuring system in which diffracted partial light beams are generated by way of partial fields which are offset with respect to each other, of which only the partial light beams of the resultant zero diffraction order are employed for signal formation. The partial light beams generated in this way are guided by direction selecting means to detectors assigned to them and converted into signals.

12 Claims, 3 Drawing Sheets

INDEX GRATING HAVING PARTIAL FIELDS THAT ARE GEOMETRICALLY OFFSET IN THE MEASURING DIRECTION

FIELD OF THE INVENTION

The present invention concerns a linear or angular measuring system for measuring the relative displacement between two objects, and more particularly, to a measuring system having a periodic grating disposed on each object so that partial light beams diffracted in the measuring direction at one grating impinge on the other grating and are again diffracted while being reflected and aimed at the first grating where they interfere.

U.S. Pat. No. 4,461,083 discloses a scanning device wherein the scanning plate has two partial scanning fields which are phase-shifted with respect to each other for detecting direction.

German Patent Publication No. DE 30 07 311 C2 discloses a two-grating measuring device wherein the scanning plate has four fields. These four fields are offset with respect to each other and provide phase-shifted scanning signals.

Also known are position measuring systems which operate with phase gratings. For example, signal production from two scanning fields wherein the sine and cosine signal light flows are separated by two oppositely inclined wedges, is described on page 65 of J. Willhelm's dissertation at the Hannover Technical University published in 1978, entitled "Dreigitterschrittgeber" [Three-Grating Step Emitter].

European Patent Publication No. EP 0 163 362 B1 discloses a position measuring device wherein it is proposed to generate a phase shift between the light beams diffracted at index gratings in that, with a given grating constant, the width of a bar of the index grating embodied as a phase grating diverges from the width of a groove, i.e. that the bar-groove ratio diverges from 1:1.

It is possible to detect the amount and direction of relative displacements between the scale grating and the index grating with the aid of partial light beams of different orders and phase-shifted with respect to each other obtained by means of such a phase grating. However, the degrees of modulation of the signals of zero and ± 1st order in incident light phase grating measuring systems with parallelly arranged index and scale gratings having bars or grooves of unequal width, are different and change unequally in the course of distance changes, soiling of the gratings, etc.

The different changes in the degrees of modulation result in symmetry errors of the electronically switched zero-symmetrical signals and thus produce measurement errors.

European Patent Publication No. EP 0 223 009 B1 discloses a linear or angular measuring device utilizing the three-grating scanning principle. The scanning grating has two scanning fields which are offset from each other in the measuring direction by ¼ of the grating constant and are embodied as phase gratings. The phase gratings of the scanning fields have a bar/groove width ratio diverging from 1:1. By means of prisms which cause optical deviations in opposite directions and which are assigned to the two scanning fields, it is possible to detect the opposite-phase signal light beams of resultant ± 1st order generated from the two scanning fields with detectors that are arranged spatially separated. The zero-symmetrical output signals which are phase-shifted by 90° and are required for the detection of the direction can be generated by electronic push-pull formation of the signals from the two scanning fields.

Great demands are made on the production of the scanning gratings of these known measuring system because both the phase relations between the signal beams of zero and ± 1st resultant diffraction order and the degrees of modulation of the signal light beams of ± 1st order critically depend on the structural parameters of the phase structures of the scanning grating.

It is thus desirable to provide a measuring system in which distance changes between the scale and scanning grating do not result in measuring errors. It is also desirable to provide a measuring system in which the production of the gratings is simple.

SUMMARY OF THE INVENTION

According to a first aspect of the present invention, a measuring system is provided. It is an object of the present invention to minimize and/or avoid the difficulties connected with the above mentioned dependencies by means of a position measuring system wherein the production of gratings is considerably simpler and distance changes between the scale and the scanning grating do not result in measuring errors.

At least three phase-shifted output signals that are identical with respect to signal strength and degree of modulation, are generated by means of the measuring system according to the present invention. In a preferred embodiment the degrees of modulation are located close to 1, almost independently of the structural parameters of the gratings.

The advantages of the measuring system according to the present invention lie in the unproblematical grating production since it is not necessary to make great demands on keeping within structural parameters for the gratings.

The present invention itself, together with further objects and attendant advantages, will best be understood by reference to the following detailed description, taken in conjunction with the accompanying drawings.

BRIEF DESCRIPTION OF THE DRAWINGS

FIG. 1b schematically illustrates a beam path through a position measuring system such as that shown in FIG. 1a.

DETAILED DESCRIPTION OF THE PRESENTLY PREFERRED EMBODIMENTS

Figure 1A:
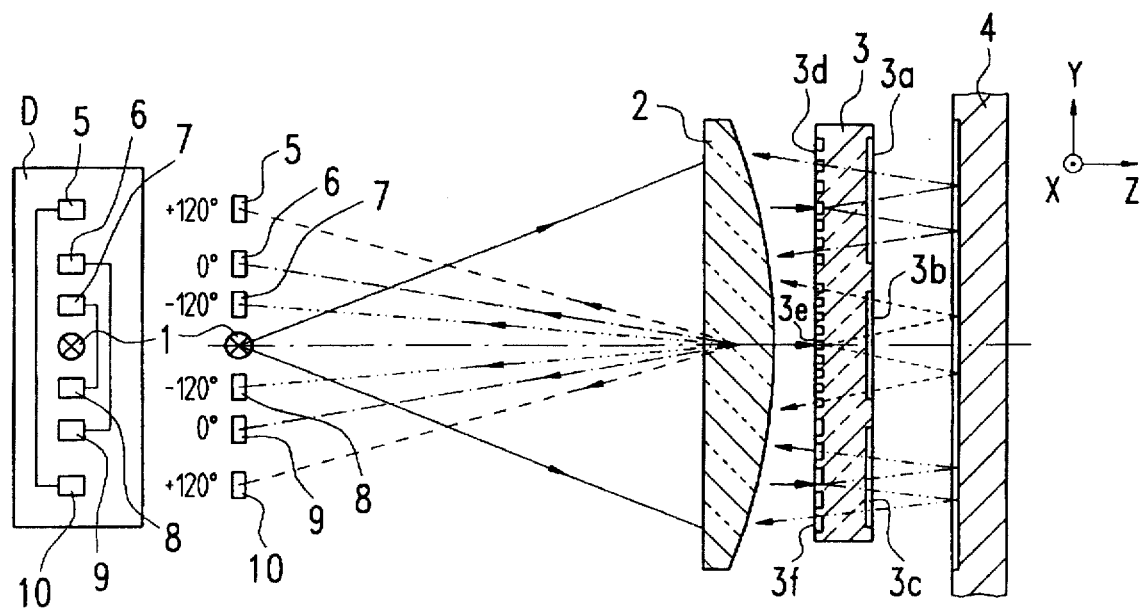
FIG. 1a is an optical diagram of a position measuring system according to a first preferred embodiment.

The optical diagram of a position-measuring device operating in accordance with the interferential measuring principle is shown greatly simplified in FIG. 1a. The direction of measurement X extends perpendicularly to the drawing plane and is identified by a circle with a central point in the coordinate diagram at the top right of FIG. 1a.

Figure 1B:
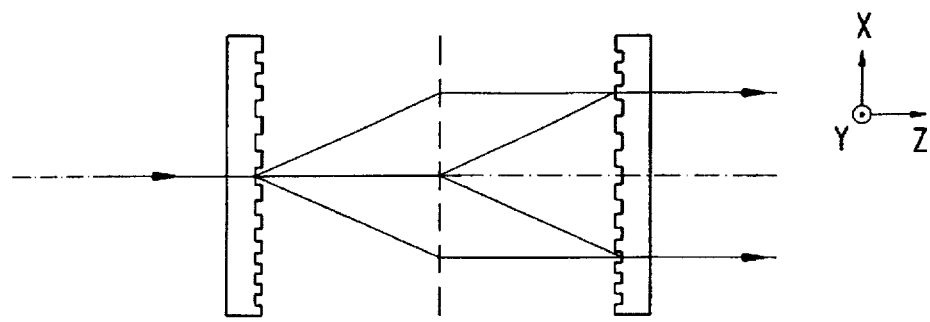

The position measuring system shown in FIG. 1a includes a light source 1, condenser 2, index grating 3, scale grating 4 and detectors 5–10. The light from light source 1 is directed in a known manner by condenser 2 to index grating 3 and passes through it. Partial light beams, not shown in FIG. 1a, diffracted in the X-direction, are generated at the index grating 3 and impinge on scale grating 4, where they are reflected and again diffracted. The reflected and diffracted beams created at scale grating 4 are aimed back at the index grating 3 where they are brought into interference. Since these steps also occur in the prior art, they are only shown schematically in FIG. 1b. The briefly described diffractions of the partial light beams lead to a signal light beam of resultant zero diffraction order after leaving the last grating and extend parallel with the grating normal.

However, in accordance with FIG. 1a, it is essential that the index grating 3 have different partial fields 3a, 3b, 3c which are offset with respect to each other in the measuring direction X. Of the partial light beams caused to interfere by the partial fields 3a, 3b, 3c, only the signal light beams of resultant zero diffraction order are used for signal formation. These signal light beams of resultant zero diffraction order extend in planes which lie parallel with the drawing plane.

In the exemplary embodiment of FIG. 1, the three partial fields 3a, 3b, 3c are disposed separated in the Y direction in order to guide the signal light beams generated from these partial fields to the detectors 5, 6, 7, 8, 9, 10 associated with them by means of deflection gratings 3d, 3e, 3f of different grating constants GK.

Figure 5:
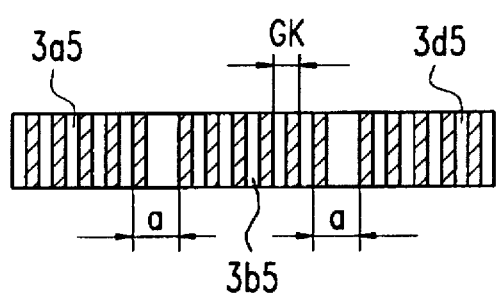
FIG. 5 is a rear view of a scanning plate shown in FIG. 4.

FIG. 5 is a rear view of a scanning plate according to a second preferred embodiment of the present invention. The partial fields 3a5, 3b5 and 3c5 are disposed separated in the X direction instead of the Y direction. It is important for the invention that the partial fields 3a, 3b, 3c are offset from each other in the measuring direction X by a fraction plus an arbitrary whole-number multiple of half the graduation period, which equals the grid constant GK.

This offset a, where $a=(N\pm\frac{1}{3})$ GK/2; N=0, 1, 2, 3 . . . , for three signal light beams respectively phase-shifted by 120° with respect to each other causes a displacement of the phase positions of the signal light beams of the resultant zero diffraction orders with respect to each other. This means that a signal light beam of resultant zero diffraction order generated by the partial field 3a, 3a3, 3a5 has a defined phase shift in respect to the respective signal light beams of resultant zero order generated by the partial fields 3b, 3b 3, 3b5 or 3c, 3c3, 3c5, wherein this phase shift is determined by the mutual offset a of the partial fields 3a, 3b, 3c or 3a3, 3b3, 3c3 or 3a5, 3b5, 3c5.

Thus, in contrast to the prior art, the phase positions of all signal light beams are exclusively determined by a geometrical offset of the above-mentioned partial fields, for which reason the phase relations between the signal light beams are also not dependent on the structural parameters of the gratings.

In order to be able to employ this phase shift of the signal light beams of resultant zero diffraction order for forming position measurement signals in accordance with measurement technology, they are guided in accordance with FIG. 1a to detectors 5, 6, 7, 8, 9, 10, which generate output signals representing the relative movement of the two objects whose position with respect to each other is to be measured.

Direction-selecting means, which are respectively associated with the partial fields 3a, 3b, 3c; 3a3, 3b3, 3c3; 3a5, 3b5, 3c5, are provided to guide the signal beam bundles to the detectors 5 to 10 assigned to them.

These direction-selecting means can be diffractive optical elements, refractive optical elements, holographic optical elements, etc.

Figure 2:
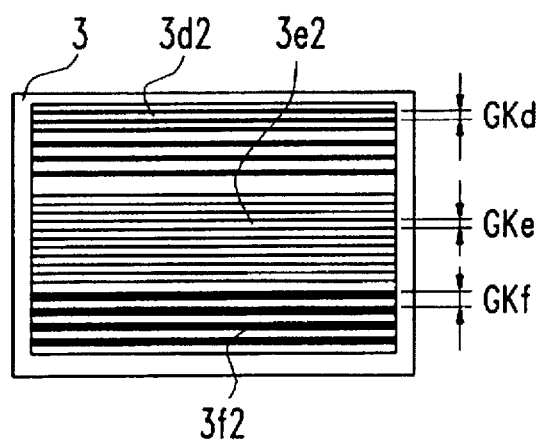
FIG. 2 is a front view of the scanning plate shown in of FIG. 1 according to a first preferred embodiment of the present invention.
Figure 3:
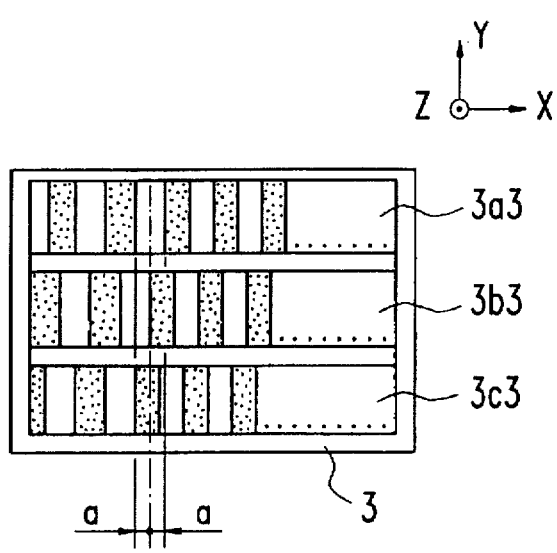
FIG. 3 is a rear view of the scanning plate shown in FIG. 2.

They are identified as 3d, 3e, 3f in FIG. 1a. In FIG. 2 they are represented as a front view of the scanning plate 3 and identified by 3d2, 3e2, 3f2. The diffraction gratings 3d2, 3e2, 3f2 are assigned to the partial fields 3a3, 3b3, 3c3 in the same way the diffraction gratings 3d, 3e, 3f are assigned to the fields 3a, 3b, 3c of the scanning plate 3, i.e., they have the same respective index grating. If embodied as diffraction gratings 3d, 3e, 3f; 3d2, 3e2, 3f2, the direction-selecting means have different grating parameters. By means of the different grating parameters, customarily different grating constants GK, the signal light beams of resultant zero order are diffracted into different directions and guided to different detectors 5 to 10.

Figure 4:
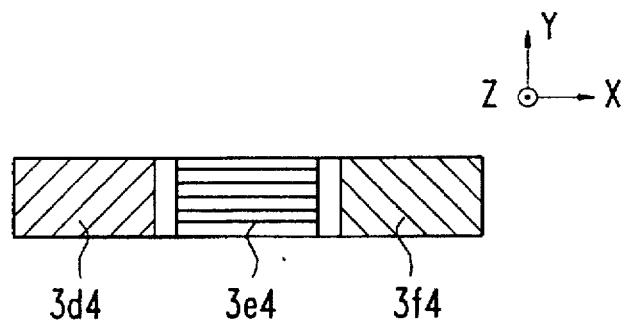
FIG. 4 is a front view of a scanning plate according to a second preferred embodiment of the present invention.

A grating line is represented in FIG. 4 which shows direction-selecting diffraction grids 3d4, 3e4, 3f4. These diffraction grids 3d4, 3e4, 3f4 are different in their orientation and further than that can have different grating constants.

FIG. 5 shows a grating line which was already mentioned and in which three diffraction gratings are represented as partial fields 3a5, 3b5, 3c5 of an index grating. They are displaced with respect to each other by an offset a, where $a=(N\pm\frac{1}{3})$ GK/2; N=0, 1, 2, 3 . . . ) and generate, together with the scale grating, signal light beams of resultant zero diffraction order and phase-shifted with respect to each other in the previously mentioned manner. These signal light beams of resultant zero diffraction order are diffracted by the partial fields 3d4, 3e4, 3f4 and guided on detectors 11, 12, 13, 14, 15, 16 arranged on a detector plate D6. Their geometric arrangement depends on the mutual orientation of the direction-selecting diffraction gratings 3d4, 3e4, 3f4 assigned to them.

Figure 6:
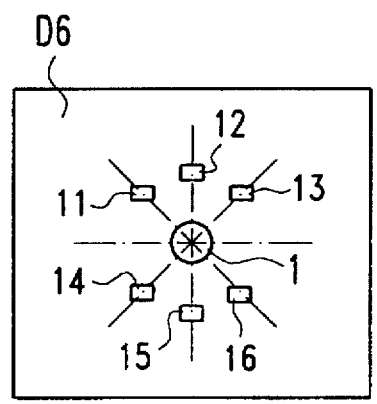
FIG. 6 is a detector field arrangement for the scanning plate shown in FIGS. 4 and 5.

The grating lines in FIGS. 4 and 5 and the detector plate D6 in FIG. 6 are arranged in an optical diagram similar to the one in FIG. 1.

Figure 7:
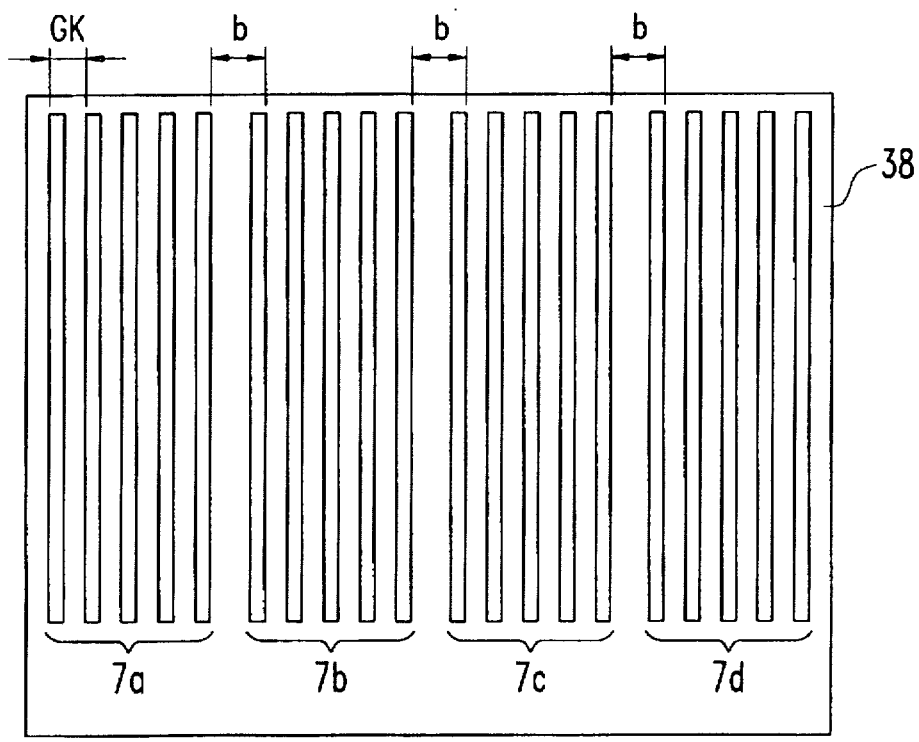
FIG. 7 is a further view of a scanning plate according to a third preferred embodiment of the present invention.

A section of an index grating 38 is shown in FIG. 7 on which four partial fields 7a, 7b, 7c, 7d for generating phase-shifted signal light beams of resultant zero diffraction order are arranged. The signal light beams of resultant zero diffraction order exit or enter the drawing plane perpendicularly with respect to it.

Figure 8:
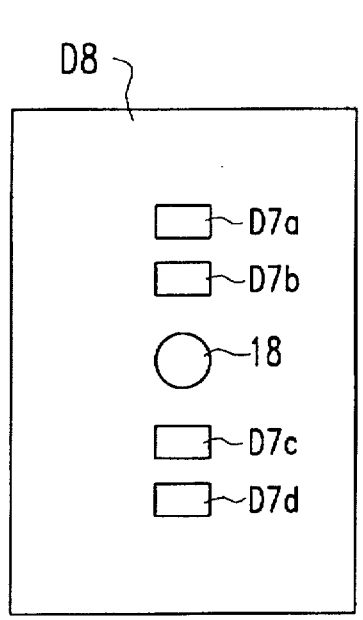
FIG. 8 is a representation of the detector geometry to be used with the scanning plate shown in FIG. 7.
Figure 9:
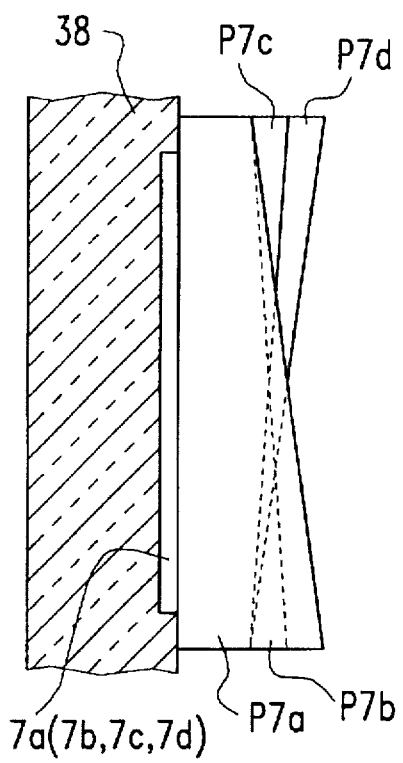
FIG. 9 is a cross-sectional view of the scanning plate shown in FIG. 7.

The four fields 7a, 7b, 7c, 7d have the grating constant GK. In respect to each other, the fields 7a, 7b, 7c, 7d have the respective offset b, where $b=(N\pm\frac{1}{4})$ GK/2; N=0, 1, 2, 3 . . . , for four signal light beams shifted by respectively 90° in relation to each other, because of which the signal light beams generated by them are in phase with relation to each other respectively by 90°. With four fields 7a, 7b, 7c, 7d it is possible to preferably generate four signals phase-shifted by 90° with respect to each other if the light beams are guided by means of direction-selecting means on the detectors D7a, D7b, D7c, D7d assigned to them, whose geometric arrangement on a plate D8 is shown in FIG. 8. The directional selection is achieved in this exemplary embodiment by means of prism wedges P7a, P7b, P7c, P7d, which are assigned to the partial fields 7a, 7b, 7c, 7d on the index grating 38, as shown in FIG. 9.

As will be appreciated the representations in the drawing figures are not to scale and are only intended to explain the principal relationships.

It is to be understood that the forms of the invention described herewith are to be taken as preferred examples and that various changes in the shape, size and arrangement of parts may be resorted to, without departing from the spirit of the invention or scope of the claims.

What is claimed is:

1. A system for measuring the relative displacement between two objects, the system comprising:
    a light source;
    a first periodic grating located on a first object, wherein the first periodic grating has at least three partial areas that are geometrically offset in the measuring direction with respect to one another;
    a second periodic grating located on a second object;
    wherein a beam of light emitted from the light source strikes the first periodic grating where it is diffracted, the diffracted beams striking the second periodic grating where they are again diffracted and reflected back onto the first periodic grating where they interfere and form signal light beams that are phase shifted with respect to each other; and
    a plurality of direction selecting means assigned to the partial areas on the first periodic grating which guide only signal light beams of the zero diffraction order to a plurality of detectors.

2. A system according to claim 1 wherein the first periodic grating represents a scanning grating and the second periodic grating represents a scale grating, and that the partial areas have a mutual offset in the measuring direction of $(N\pm 1/AT)GK/2$, wherein AT is the number of the partial areas.

3. A system according to claim 2, wherein the partial areas offset in respect to each other are components of the scanning grating.

4. A system according to claim 1, wherein the first and second periodic gratings have equal grating constants.

5. A system according to with claim 1 wherein the first and second periodic gratings have unequal grating constants.

6. A system according to claim 5 wherein the first periodic grating has twice the grating constant of the second periodic grating.

7. A system according to claim 2 wherein the first periodic grating (3) has three partial areas which have an offset in the measuring direction of $(N/2\pm 1/6)GK$ with respect to each other.

8. A system according to claim 2 wherein the first periodic grating has four partial areas which have an offset in the measuring direction of $(N/2\pm 1/8)GK$ with respect to each other.

9. A system according to claim 1 wherein the direction selecting means are diffraction gratings.

10. A system according to claim 9 wherein the diffraction gratings have mutually different grating constants.

11. A system according to claim 9 wherein the diffraction gratings have different orientations.

12. A system according to claim 1 wherein in that the direction-selecting means are prism wedges of different inclination.

* * * * *

UNITED STATES PATENT AND TRADEMARK OFFICE
CERTIFICATE OF CORRECTION

PATENT NO. : 5,678,319
DATED : October 21, 1997
INVENTOR(S) : Walter Huber

It is certified that error appears in the above-indentified patent and that said Letters Patent is hereby corrected as shown below:

In claim 5, line 1, delete "with".

In claim 12, line 1, delete "in that".

Signed and Sealed this

Second Day of May, 2000

Attest:

Attesting Officer

Q. TODD DICKINSON

Director of Patents and Trademarks